Oct. 8, 1940.   D. R. McNEAL   2,217,491

VALVE FOR LUBRICANT COOLING SYSTEMS

Filed April 15, 1939   2 Sheets-Sheet 1

INVENTOR
Daniel Raymond McNeal
BY
Synnestvedt & Lechner
ATTORNEYS

Oct. 8, 1940.  D. R. McNEAL  2,217,491
VALVE FOR LUBRICANT COOLING SYSTEMS
Filed April 15, 1939  2 Sheets-Sheet 2
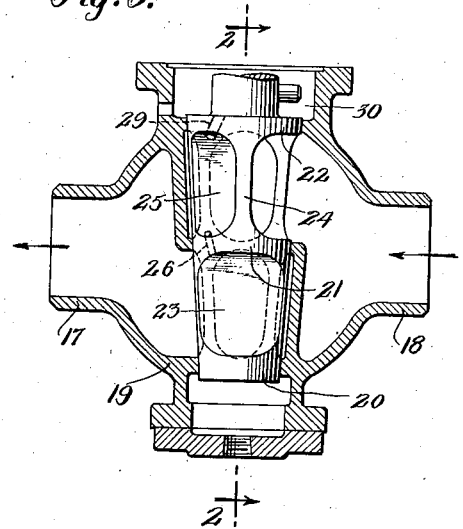
Fig. 3.
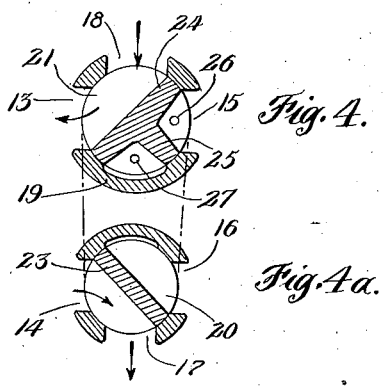
Fig. 4.
Fig. 4a.
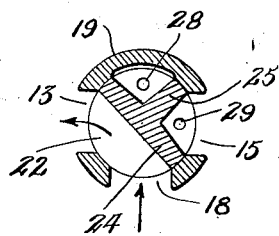
Fig. 4b.
INVENTOR
Daniel Raymond McNeal
BY
Synnestvedt & Lechner
ATTORNEYS Patented Oct. 8, 1940

2,217,491

UNITED STATES PATENT OFFICE 2,217,491

VALVE FOR LUBRICANT COOLING SYSTEMS

Daniel Raymond McNeal, Abington, Pa., assignor to Andale Company, Philadelphia, Pa., a corporation of Pennsylvania Application April 15, 1939, Serial No. 268,003

10 Claims. (Cl. 184—6)

This invention relates to equipment for cooling lubricating oil and a valve means therefor.

For many purposes, such, for instance, as lubrication of the bearings of a turbine, it is desirable to use a lubricating oil circulation system in which means are provided for cooling the lubricant before it is re-circulated to the bearings. Since turbines and other mechanisms of this type are quite commonly required to maintain uninterrupted operation over long periods of time, the oil cooling system preferably incorporates two heat exchange or cooling units which may alternatively be placed in the circulation system. Preferably, a valve means is employed for changeover from one unit to the other.

A system of this general type is disclosed in my copending application Serial No. 190,971, filed February 17, 1938. As shown in said application, the installation of the cooling units and the associated changeover valve may be of two different types. In both of said types of installation, a supply or reservoir of lubricating oil is employed, and in one type the cooling units and the valve are at least in large part submerged below the level of the oil in the reservoir. Various features of the present invention are applicable to both types of installation, although certain features of the invention are of especial use in connection with the type of installation in which at least the valve mechanism is submerged in the reservoir of oil.

Referring to the objects of the invention, it may be noted that the features of the valve mechanism claimed herein are not limited in their application to a system for lubrication of turbine bearings nor even to lubricating equipment. However, the invention is described as applied to a lubrication system for the bearings of a turbine for two principal reasons—first, since this particular type of lubrication system is probably the one in which the novel features of the valve would most commonly be used, and second, since certain aspects of the invention are of especial utility in association with a lubrication system.

Bearing in mind that the circulation system receives its supply of oil from the reservoir and then delivers the oil through the valve mechanism alternatively to either one of the coolers, and from there to the turbine bearings and finally back to the reservoir, it will at once be apparent that in the event there is any leakage in the valve from the active side to the side which is closed off, that leakage will result either in a rise in the oil level or an increase in pressure in the cooler which is out of service, depending on whether the cooler is open (as through a vent) or is completely sealed closed. Both of these conditions are undesirable, since, on the one hand, if the cooler is open leakage around the valve will cause the oil to overflow, while on the other hand, if the cooler is closed a dangerous pressure condition may result. In the latter condition, such coolers have even been known to rupture as a result of a temperature increase, causing the oil to expand.

The foregoing are difficulties which have been encountered with certain prior installations, and the invention provides for automatic opening of a discharge port from the cooler which is out of service by virtue of positioning of the valve to direct the circulation through the other cooler. In this way overflow of oil or pressure build-up, as a result of leakage through the valve, is prevented.

How the foregoing and other objects and advantages are attained will be apparent from the following description referring to the accompanying drawings, in which—

Figure 3 is a vertical section taken at right angles to the section of Figure 2, as indicated by the section line 3—3 on Figure 2;

Figure 2:
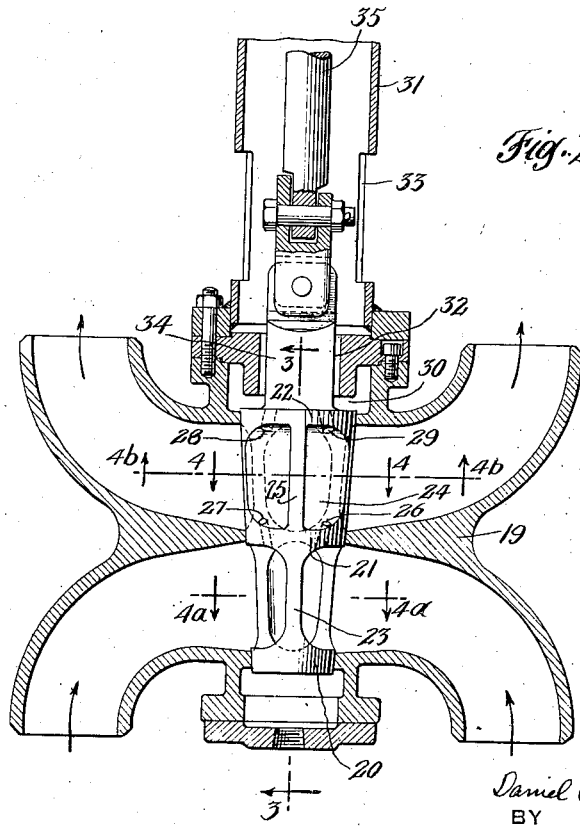
Figure 2 is a vertical sectional view through the valve mechanism illustrated in Figure 1, this view being taken as indicated by the section line 2—2 on Figure 3.

Figures 4 and 4a are horizontal sectional views through portions of the valve mechanism taken looking downwardly at the lines 4—4 and 4a—4a in Figure 2; and Figure 4b is a horizontal sectional view through the valve taken looking upwardly from the section line 4b—4b on Figure 2.

Figure 1:
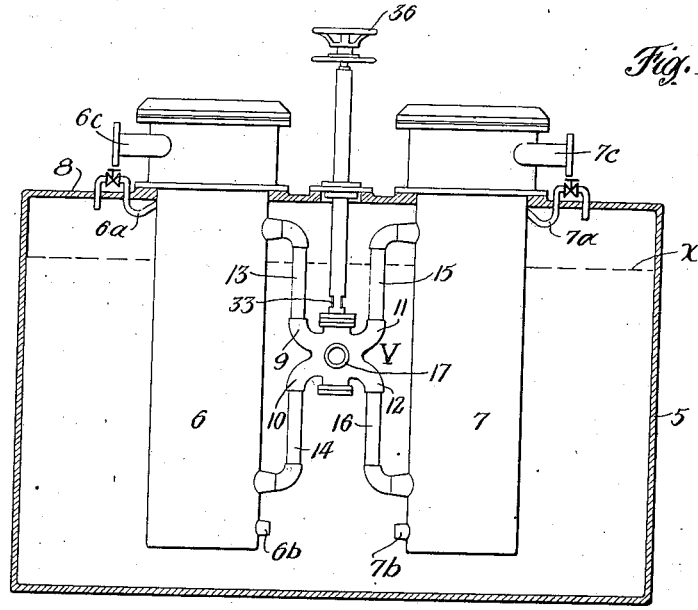
Figure 1 is a somewhat diagrammatic vertical sectional view through an oil reservoir in which are submerged a pair of cooling units, together with an associated controlling valve mechanism, in accordance with the invention.

The reservoir is shown in Figure 1 at 5, the oil level therein appearing at x. The two cooler units 6 and 7 are in large part submerged in the oil in the reservoir, but project upwardly above the upper wall 8 of the reservoir. The valve mechanism is generally indicated by the letter V in Figure 1, and is shown as being provided with four branches 9, 10, 11 and 12. The branches 9 and 10 are, respectively, connected with the inlet and outlet pipes 13 and 14 of the unit 6, the branches 11 and 12 being coupled with the inlet and outlet pipes 15 and 16 for the unit 7. The valve has an outlet connection 17 which is adapted to be coupled with a pipe extended to the bearings of the turbine or other device being lubricated. The valve also has an inlet in direct communication with the oil in the reservoir located in the corresponding position at the opposite side of the valve.

The heat exchange units 6 and 7 are each provided with a vent adjacent the uppermost part of the oil side thereof, the vents appearing at 6a and 7a. In addition, each unit is provided with a normally plugged drain 6b or 7b adjacent the bottom of the oil side.

A cooling medium may be circulated through the units by means of connections, one of a pair for each unit being shown at 6c and 7c.

At this point it may be noted that a valve mechanism of the general type shown in Figure 1, i. e., a changeover or duplex valve, is illustrated in my prior copending application Serial No. 87,408, filed June 26, 1936, and also in my copending application hereinabove referred to.

The valve mechanism is shown more in detail in Figures 2 and 3, and includes a casing 19 from which the branches or connections 13 to 18 extend, and a valve body in the casing in general made up of the horizontal superimposed and spaced disk partitions 20, 21 and 22, with intervening vertical partitions 23 (between disks 20 and 21) and 24 and 25 (between disks 21 and 22). The arrangement of the upright partitions 23, 24 and 25 clearly appears from inspection of Figures 4 and 4a. The several partitions of the valve body and the chambers and connections of the casing are all so disposed that the main inlet 18 may be placed in communication either with the inlet connection 13 for one of the coolers or with the inlet connection 15 for the other cooler, and also so that the main outlet connection 17 may be placed in communication either with the outlet connection 14 for the first cooler or with the outlet connection 16 for the other. The relationship of these connections clearly appears in Figures 4 and 4a, the position therein shown being that in which the cooler 6 is in service and the cooler 7 out of service.

The foregoing valve arrangements just described are essentially similar to those disclosed in my prior application Serial No. 190,971, which said prior application also discloses by-pass ports 26 and 27 formed through the central disk 21 of the valve, the function of these ports being to provide intercommunication between the inlet and outlet sides of that cooler which is shut off by the valve, thereby facilitating venting of the entire system, including the cooler, through vent 6a or 7a. These vents communicate with the top of the oil side of the coolers and each is provided with a shut off valve which may be closed during operation of the respective coolers. As shown, the vents preferably discharge into the reservoir space.

The action of the valve further provides for gradual changeover from one cooler to the other, so that the changeover is effected while maintaining a substantially constant and uniform supply of oil to the turbine bearings.

As shown in Figure 4b, in accordance with the present invention, the uppermost disk 22 of the valve body is also provided with ports 28 and 29 establishing communication between certain of the valve chambers and the reservoir. The manner of communication with the reservoir will be apparent from inspection of Figure 2, in which it will be seen that the ports 28 and 29 open at their upper ends into an annular space 30 which is in communication with the interior of the tube 31 through the annular passage 32. The tube 31 is apertured as at 33 (see also Figure 1) at a level below the level $x$ of the oil in the reservoir.

As seen in Figure 4b, when the valve is positioned to place the cooler 6 into circulation and shut off the cooler 7, the port 28 is so located in the disk 22 that it is blanked off by the valve casing 19, the port 29, however, being in a location such that it establishes communication between the inlet passage 15 for the cooler 7, thereby providing intercommunication between cooler 7 and the reservoir. Conversely, when the valve is positioned to place the unit 7 into circulation and to shut off the unit 6, the port 29 becomes blanked and the port 28 places the inlet connection 13 for the unit 6 into communication with the reservoir.

Because of the foregoing, in the event of leakage past the valve from the active side thereof to the side which is not in service, the oil leakage will return to the reservoir. In fact, the intercommunication between the reservoir and the cooler out of service will cause the oil levels in that cooler and the reservoir to equalize through the associated drain port 28 or 29. The operation will be in accordance with the foregoing, provided the valve is located below the level of the oil in the reservoir although, regardless of the relationship between the oil level in the reservoir and the valve, the drain ports 28 and 29 will still function to prevent build-up of pressure in or overflow of oil from the cooler which is out of service, either when the same is open for inspection or through the vent passage provided toward the top of the oil space thereof.

The position of the valve may be adjusted through its stem 34 which is coupled with the operating rod 35 extended upwardly and out of the reservoir for actuation by means of the hand wheel 36, in the manner fully set out in my copending application Serial No. 234,880, filed October 14, 1938.

While the drain ports 28 and 29 may be coupled or piped for discharge at any desired point (as, for instance, to an oil supply tank in an installation in which the coolers and valve are not submerged in the reservoir), the drain ports are most conveniently used in association with the submerged type of installation herein illustrated, since the ports may then provide direct intercommunication between the reservoir and that particular cooler which is idle at any given time.

Although the drain ports may alternatively be located in other portions of the valve or may even be associated with the connected piping of the circulation system, the particular form of drain port illustrated is perhaps the simplest.

I claim:

1. Equipment for cooling lubricating oil including in combination with a source of supply of oil, a pair of heat exchange units for cooling the oil, an oil circulation system including valve means having a main inlet receiving oil from said source and a main outlet for delivery of cooled oil to a point of use, the valve means providing for flow of oil serially from said inlet alternatively through either one of said units and thence to said outlet, and means associated with the circulation system providing communication between one of said units and said source when the valve means is positioned to shut off flow through that unit.

2. Equipment for cooling lubricating oil including in combination with a source of supply of oil, a pair of heat exchange units for cooling the oil, an oil circulation system including valve means having a main inlet receiving oil from said source and a main outlet for delivery of cooled oil to a point of use, the valve means providing for flow of oil serially from said inlet alternatively through either one of said units and thence to said outlet, and portage associated with the valve means and providing communication between one of said units and said source when the valve means is positioned to shut off flow through that unit.

3. Equipment for cooling lubricating oil including in combination with a source of supply of oil, a pair of heat exchange units for cooling the oil, an oil circulation system including valve means having a main inlet receiving oil from said source and a main outlet for delivery of cooled oil to a point of use, the valve means providing for flow of oil serially from said inlet alternatively through either one of said units and thence to said outlet, and means associated with the valve means and providing for discharge of oil from one of said units when the valve means is positioned to shut off flow through that unit.

4. Equipment for cooling lubricating oil including in combination with an oil reservoir, a pair of heat exchange units for cooling the oil, an oil circulation system including valve means at least in part submerged in the oil in said reservoir and having a main inlet receiving oil from said source and a main outlet for delivery of cooled oil to a point of use, the valve means providing for flow of oil serially from said inlet alternatively through either one of said units and thence to said outlet, and the valve means having portage providing communication between one of said units and the reservoir when the valve means is positioned to shut off flow through that unit.

5. Equipment for cooling lubricating oil including in combination with a source of supply of oil, a pair of heat exchange units for cooling the oil, each of which has a vent at a high point in the oil side thereof, an oil circulation system including valve means having a main inlet receiving oil from said source and a main outlet for delivery of cooled oil to a point of use, the valve means providing for flow of oil serially from said inlet alternatively through either one of said units and thence to said outlet, and means associated with the circulation system providing communication between one of said units and said source when the valve means is positioned to shut off flow through that unit, whereby in the event of leakage of oil in the valve means from the side which is in circulation to that side which is shut off, the leakage will return to said source and thereby avoid overflow of oil from the vent for the unit which is shut off.

6. Equipment for cooling lubricating oil including in combination with a source of supply of oil, a pair of heat exchange units for cooling the oil, each having a vent adjacent the top of the oil side thereof, an oil circulation system including valve means having a main inlet receiving oil from said source and a main outlet for delivery of cooled oil to a point of use, the valve means providing for flow of oil serially from said inlet alternatively through either one of said units and thence to said outlet, the valve means being located vertically at a level below the level of said vents, by-pass portage interconnecting the inlet and outlet for one of said units when the valve means is positioned to shut off flow through that unit, and means associated with the valve means and providing for discharge of oil from one of said units when the valve means is positioned to shut off flow through that unit.

7. Equipment for cooling lubricating oil including in combination with an oil reservoir, a pair of heat exchange units for cooling the oil, each having a vent adjacent the top of the oil side thereof, an oil circulation system including valve means having a main inlet receiving oil from said reservoir and a main outlet for delivery of cooled oil to a point of use, the valve means being at least in part submerged in the oil in said reservoir and providing for flow of oil serially from said inlet alternatively through either one of said units and thence to said outlet, said vents being located vertically at a level above the valve means, by-pass portage interconnecting the inlet and outlet for one of said units when the valve means is positioned to shut off flow through that unit, and means associated with the circulation system providing communication between one of said units and the reservoir when the valve means is positioned to shut off flow through that unit.

8. Equipment for cooling lubricating oil including in combination with an oil reservoir, a pair of heat exchange units for cooling the oil, each having a vent adjacent the top of the oil side thereof, an oil circulation system including valve means having a main inlet receiving oil from said reservoir and a main outlet for delivery of cooled oil to a point of use, the valve means being at least in part submerged in the oil in said reservoir and providing for flow of oil serially from said inlet alternatively through either one of said units and thence to said outlet, said vents being located vertically at a level above the valve means, by-pass portage interconnecting the inlet and outlet for one of said units when the valve means is positioned to shut off flow through that unit, and means associated with the circulation system providing communication between one of said units and the reservoir when the valve means is positioned to shut off flow through that unit, said means comprising a port formed in the valve providing direct intercommunication between the reservoir and the unit which is shut off.

9. Equipment for cooling lubricating oil including in combination with an oil reservoir, a pair of heat exchange units for cooling the oil, an oil circulation system including valve means comprising a casing and a valve body and having a main inlet receiving oil from said source and a main outlet for delivery of cooled oil to a point of use, the valve means being at least in part submerged in the oil in said reservoir and providing for flow of oil serially from said inlet alternatively through either one of said units and thence to said outlet, and means associated with the valve means and providing for discharge of oil from one of said units when the valve means is positioned to shut off flow through that unit, said last means comprising portage formed in the valve body and providing direct intercommunication between said reservoir and the said unit which is shut off.

10. Equipment for cooling lubricating oil including in combination with an oil reservoir, a pair of heat exchange units for cooling the oil, each having a vent adjacent the top of the oil side thereof, an oil circulation system including valve means having a main inlet receiving oil from said reservoir and a main outlet for delivery of cooled oil to a point of use, the valve means being at least in part submerged in the oil in said reservoir and providing for flow of oil serially from said inlet alternatively through either one of said units and thence to said outlet, the valve means being located vertically at a level below the level of said vents, by-pass portage interconnecting the inlet and outlet for one of said units when the valve means is positioned to shut off flow through that unit, and means associated with the valve means and providing for direct discharge of oil from one of said units to said reservoir when the valve means is positioned to shut off flow through that unit.

DANIEL RAYMOND McNEAL.